United States Patent [19]
Kang

[11] Patent Number: 6,055,070
[45] Date of Patent: Apr. 25, 2000

[54] FLAT BED SCANNER APPARATUS

[75] Inventor: Sung-Wook Kang, Kyonggi-do, Rep. of Korea

[73] Assignee: SamSung Electronics Co., Ltd., Suwon, Rep. of Korea

[21] Appl. No.: 09/024,302

[22] Filed: Feb. 17, 1998

[30] Foreign Application Priority Data

Feb. 14, 1997 [KR] Rep. of Korea ........................ 97-4369

[51] Int. Cl.$^7$ .............................. H04N 1/04; G03G 15/00
[52] U.S. Cl. .......................... 358/497; 358/496; 358/498; 399/367
[58] Field of Search ..................................... 358/496, 494, 358/497, 498, 474; 355/321; 399/367

[56] References Cited

U.S. PATENT DOCUMENTS

| | | | |
|---|---|---|---|
| 4,958,825 | 9/1990 | Onomoto et al. ....................... | 271/119 |
| 5,075,539 | 12/1991 | Shiraishi ............................... | 250/208.1 |
| 5,077,585 | 12/1991 | Watanabe et al. ...................... | 355/321 |
| 5,100,022 | 3/1992 | Fukudome et al. ..................... | 221/198 |
| 5,104,109 | 4/1992 | Kubo ..................................... | 271/110 |
| 5,313,312 | 5/1994 | Yamada .................................. | 358/505 |
| 5,379,095 | 1/1995 | Oishi ...................................... | 355/233 |
| 5,485,263 | 1/1996 | Bjorner et al. ......................... | 356/4.01 |
| 5,513,017 | 4/1996 | Knodt et al. ........................... | 358/471 |
| 5,523,848 | 6/1996 | Musso et al. ........................... | 358/296 |
| 5,537,214 | 7/1996 | Aiba et al. .............................. | 358/296 |
| 5,537,219 | 7/1996 | Morikawa et al. ..................... | 358/406 |
| 5,638,189 | 6/1997 | Yanagisawa ............................ | 358/481 |
| 5,717,200 | 2/1998 | Hashimoto ............................ | 250/208.1 |
| 5,856,879 | 1/1999 | Suzuki et al. .......................... | 358/474 |
| 5,864,408 | 1/1999 | Kumashiro ............................. | 358/496 |
| 5,878,319 | 3/1999 | Itoh ........................................ | 358/496 |
| 5,909,290 | 6/1999 | Kajiwara ................................ | 358/488 |

*Primary Examiner*—Joseph Mancuso
*Assistant Examiner*—Hien Truong
*Attorney, Agent, or Firm*—Robert E. Bushnell, Esq.

[57] ABSTRACT

A flat bed scanner apparatus for scanning sheets with a stacked-sheet feeder and a flat bed cover separated from one another. The flat bed scanner apparatus includes a flat bed and a flat bed cover to be used for scanning an individual sheet, a stacked-sheet feeder separate from the flat bed cover for feeding a plurality of sheets seriatim, and a scanning module installed inside the flat bed scanner apparatus, for selectively scanning a sheet on the flat bed and a sheet from the stacked-sheet feeder by varying an optical path of light illuminating the sheets.

20 Claims, 4 Drawing Sheets

FLAT BED SCANNER APPARATUS

CLAIM OF PRIORITY

This application makes reference to, incorporates the same herein, and claims all benefits accruing under 35 U.S.C. §119 from an application for FLATBED SCANNER APPARATUS earlier filed in the Korean Industrial Property Office on Feb. 14, 1997, and there duly assigned Ser. No. 4369/1997, a copy of which is annexed hereto.

BACKGROUND OF THE INVENTION

1. Technical Field

The present invention relates to a flat bed scanner apparatus, and more particularly, to an improved flat bed scanner apparatus for scanning sheets having a stacked-sheet feeder which is separate from a flat bed cover, causing the flat bed cover to be much easier to open and close.

2. Related Art

A conventional scanner is designed to convert data recorded on paper into a computer-compatible electronic form. The data recorded on a document can be scanned as follows. An amount of light is first transmitted to the document from a source. As a result, the image data on the document causes some of that light to be reflected in a particular pattern. The pattern of reflected light is then supplied to a fixed array of light sensors through an intermediate image reduction mirror. The light sensors in the array can be charge-coupled devices (CCD) or contact image sensors (CIS). Then circuitry in the scanner senses the status of each sensing element in the array one by one, in order to register the brightness of each point in each individual scan line. After the scanner has collected and arranged the data from each sensor, the next line of data can be read.

A first type of scanner has a flat bed cover and a flat bed platen for scanning a single sheet but does not have an automatic sheet feeder. A user scans a sheet by lifting the flat bed cover, placing the sheet face down onto the flat bed platen, and then closing the flat bed cover. Then the user typically presses a "start" button in order to cause the scanner to scan the sheet. One problem with this type of scanner is the fact that it requires a lot of work to scan a stack of sheets. For each sheet to be scanned, a user must lift the cover, place the sheet onto the flat bed platen, lower the cover, press the "start" button, lift the cover again, and remove the sheet. This procedure can be time consuming and tedious when a user needs to scan a large stack of sheets.

A second type of scanner creates a new problem while it attempts to solve the problem above. The second scanner type includes the flat bed platen and flat bed cover of the first type of scanner and, additionally, has an automatic stacked-sheet feeder. This scanner type has an automatic stacked-sheet feeder which either is attached directly to the upper portion of the flat bed cover or is located immediately above the flat bed cover. In either arrangement, the stacked-sheet feeder is necessarily lifted or moved whenever the flat bed cover is lifted, in order to place or remove a sheet onto the flat bed platen. The stacked-sheet feeder can automatically scan a stack of sheets, one at a time. The stacked-sheet feeder typically has a tray for sheets and will feed a stack of sheets into the scanner, one at a time, until all sheets in the tray have been scanned. This appears to eliminate the problem of the first type of scanner. That is, a user does not need to perform the following procedure for each sheet to be scanned: lift a cover, place a sheet on the platen, close the cover, then press the "start" button, lift the cover again, and then remove the sheet from the platen. Unfortunately, the second type of scanner created a new problem. The paper tray, rollers, sensors, and other components associated with an automatic stacked-sheet feeder can be unnecessarily heavy. The problem with the scanners having an automatic stacked-sheet feeder is the fact that the cover can be heavy and difficult to lift. When a user wants to scan a single sheet on the flat bed platen, the user must lift the heavy cover. A user will want to user the flat bed platen in lieu of the stacked-sheet feeder if the document to be scanned is a page in a book. Lifting the heavy cover and stacked-sheet feeder is extremely inconvenient and unnecessarily burdensome. Some examples of this type of scanner are disclosed in U.S. Pat. No. 5,537,219 for Movable Image Reading Apparatus issued to Morikawa et al. and U.S. Pat. No. 5,379,095 for Image Reading Apparatus With the Optical Reading Units and Photoelectric Conversion Device Mounted on a Common Guide Member issued to Oishi.

Another problem with the aforementioned second type of scanner is the fact that it requires a lot of space when the cover is lifted. Also, the scanner apparatus itself can be heavy and difficult to move. In addition, the sheet feeder system can occupy a lot of space and constitute an inefficient use of space, even when the cover is closed.

Some scanners and other devices use movable mirrors. Some examples of devices with movable mirrors are disclosed in U.S. Pat. No. 5,638,189 for Raster Scanner, Mirror Supporting Structure of the Same and Method for Adjusting Mirror Angle Using the Structure issued to Yanagisawa and U.S. Pat. No. 5,485,263 for Optical Path Equalizer issued to Bjorner et al.

Other examples of scanner devices are disclosed in U.S. Pat. No. 5,513,017 for Automatic Document Imaging Mode Selection System issued to Knodt et al., U.S. Pat. No. 5,523,848 for Ink Jet Printing Device and Plain Paper Facsimile Apparatus Using the Same issued to Musso et al., and U.S. Pat. No. 5,075,539 for Method and Apparatus for Adjusting the Position of Image Reading Equipment issued to Shiraishi.

Some devices having a sheet feeder are disclosed in U.S. Pat. No. 5,313,312 for Color Image Processing Apparatus Capable of Discriminating Attributes of Originals Fed by a Feeder issued to Yamada, U.S. Pat. No. 4,958,825 for Paper Let-out Apparatus issued to Onomoto et al., U.S. Pat. No. 5,100,022 for Sheet Container and Sheet Dispenser Apparatus issued to Fukudome et al., and U.S. Pat. No. 5,104,109 for Paper Sheet Delivery/Stacking Control System Using Fuzzy Inference issued to Kubo.

Accordingly, I have discovered that it would be desirable to enhance scanner construction by providing an improved flat bed scanner apparatus with a stacked-sheet feeder and a flat bed cover that is easier to operate, with a smaller design in order to more efficiently utilize available space and cause the scanner apparatus to be easier to move.

SUMMARY OF THE INVENTION

It is an object of the present invention to provide a flat bed scanner apparatus with a stacked-sheet feeder and a flat bed cover separated from one another.

It is another object of the present invention to provide a flat bed scanner apparatus which is smaller and can more efficiently utilize available space.

It is still another object of the present invention to provide a flat bed scanner apparatus which can easily be moved.

A flat bed scanner apparatus according to the principles of the present invention includes a manual sheet feeder for feeding an individual sheet on a flat bed, a stacked-sheet feeder installed at one end of the flat bed, for sequentially feeding a plurality of sheets, and a scanning module installed inside the flat bed scanner apparatus, for selectively scanning a sheet on the flat bed and a sheet from the stacked-sheet feeder by varying an optical path of light illuminating the sheets.

Moreover, the flat bed scanner apparatus according to the principles of the present invention has a first original reading surface for holding thereon an original sheet to be read, a second original reading surface for holding thereon an original sheet to be read, a cover being movable between a closed position covering the original sheet on said first original reading surface and an open position allowing removal of the original sheet from said first original reading surface, a sheet feeder system separate from said cover and attached to said flat bed scanner apparatus, allowing said cover to be moved between said open position and said closed position without substantially moving said sheet feeder system, transporting the original sheet onto said second original reading surface and subsequently discharging the original sheet downstream from said second original reading surface, an optical reading unit for reading the original sheet, comprising a rotation mirror with a first mirror position reflecting light from the original sheet on said first original reading surface and a second mirror position reflecting light from the original sheet on said second original reading surface, and a reciprocation apparatus reciprocating said optical reading unit for reading the original sheet on said first original reading surface.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
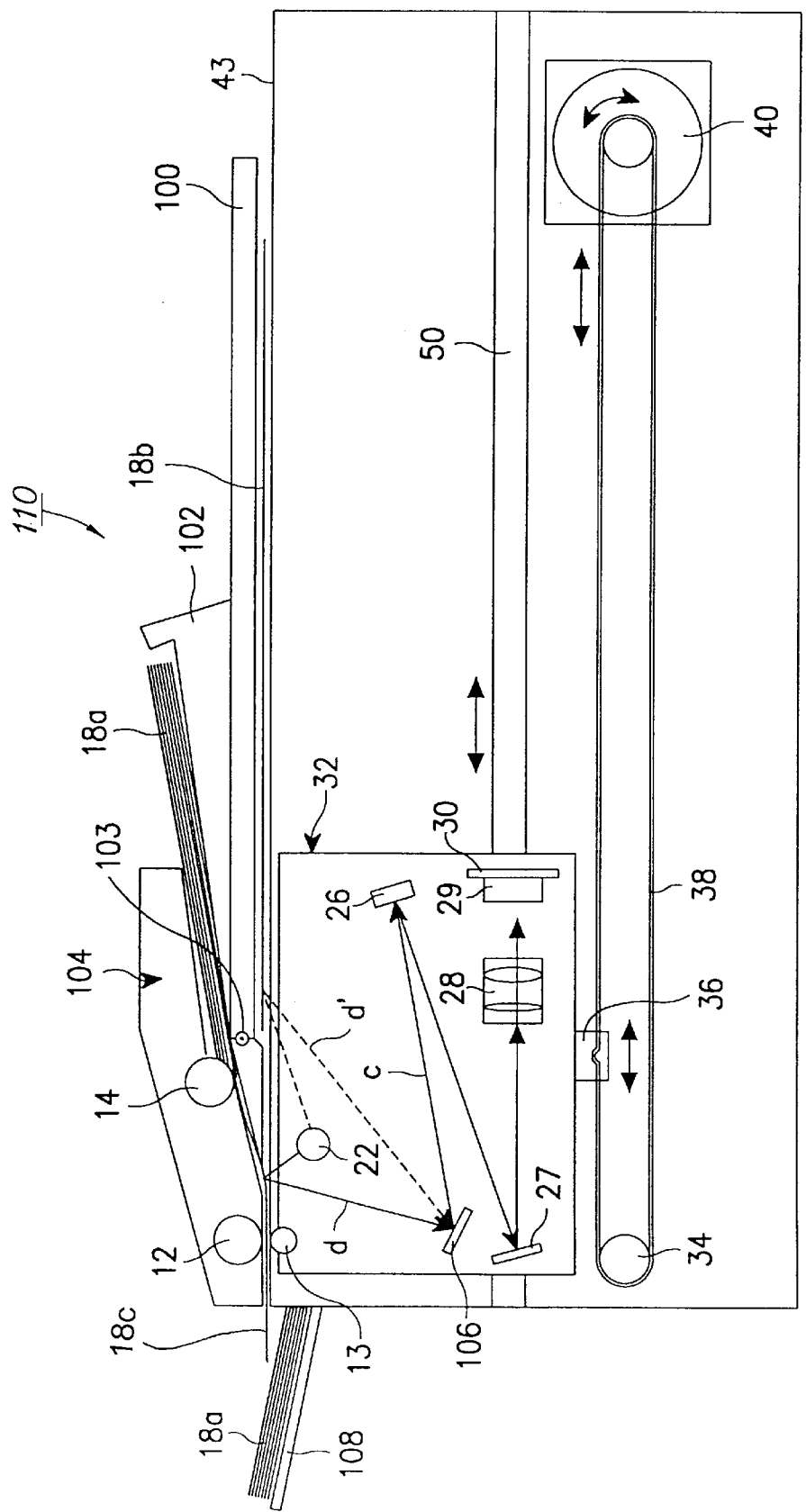
FIG. 1 illustrates a schematic diagram of an exemplary flat bed scanner apparatus in which a stacked-sheet feeder is connected to the upper portion of a flat bed cover.

Refer now to the drawings and particularly to FIG. 1, which illustrates a schematic diagram of an exemplary flat bed scanner apparatus in which a stacked-sheet feeder is connected to the upper portion of a flat bed cover. FIG. 1 shows a flat bed scanner apparatus in which a stacked-sheet feeder 104 is installed at the upper portion of a flat bed cover 100. The flat bed scanner apparatus includes a manual scanning area 110 for placing an individual sheet 18b on a flat bed 43 and the stacked-sheet feeder 104 for feeding sheets 18a stacked in a sheet feeding cassette 102. The stacked-sheet feeder 104 is installed at the upper portion of the manual scanning area 110.

In FIG. 1, the manual scanning area 110 has the flat bed 43 on which the individual sheet 18b is placed, and the sheet cover 100 for firmly holding the sheet 18b on the flat bed 43. The sheet cover 100 has one end installed at a scanner frame by a hinge 103 and moves up and down. A scanning module 32 installed within the flat bed 43 sequentially scans the sheets 18a stacked in the sheet feeding cassette 102 and scans the sheet 18b on the flat bed 43. A lamp 22 in the scanning module 32 illuminates the sheet 18c fed by the stacked-sheet feeder 104 and also illuminates the sheet 18b on the flat bed 43. A first mirror 106 inclined at a constant angle receives light d reflected from the sheet 18c fed by the stacked-sheet feeder 104 or light d' reflected from the sheet 18b. A second mirror 26 receives light c from the first mirror 106 and reflects it toward a third mirror 27. The third mirror 27 receives light from the second mirror 26 and reflects the light to a lens 28. A charge coupled device (CCD) sensor 29 installed separately from the lens 28 is installed at a charge coupled device board 30. The charge coupled device sensor 29 receives light that was focused by lens 28.

FIG. 1 shows a driving motor 40 situated below the scanning module 32 which reciprocates the scanning module 32 in the right and left direction when the scanning module 32 scans the sheet 18b on the flat bed 43. A belt 38 for transmitting the driving force of the driving motor 40 is inserted into a belt pinch roller 34. A belt hanger 36 for hanging the belt 38 thereon is installed at the bottom of the scanning module 32. A shaft 50, serving as a guide when the scanning module 32 moves in the right and left directions by the belt 38, is installed at the scanning module 32. The stacked-sheet feeder 104 for feeding the sheets 18a is installed at one side of the upper portion of the sheet cover 100. The sheets 18a are stacked in the sheet feeding cassette 102 installed at one side of the upper portion of the sheet cover 100. An automatic sheet feeding roller 14 for feeding the sheets one by one by frictional force is installed at one end of the sheet feeding cassette 102. A pinch roller 13 and an exit roller 12 for ejecting the sheet scanned by the scanning module 32 to a tray 108 are in contact with each other.

With reference to FIG. 1, a process for scanning the sheet on the flat bed 43 in the manual scanning area 110 will now be described. The sheet cover 100 is lifted up in order to place the sheet 18b onto the flat bed 42. When the sheet cover 100 is lifted up, the stacked-sheet feeder 104 installed at the upper portion of the sheet cover 100 must also be lifted up. When the scanning function starts, the belt 38 is rotated along the belt pinch roller 34 and the belt hanger 36 by the rotating force of the driving motor 40. The scanning module 32 performs reciprocating motion in the right and left direction along the shaft 50. The lamp 22 installed within the scanning module 32 illuminates the sheet 18b, and the light d' reflected from the sheet 18b is transmitted to the first mirror 106. The first mirror 106 receives the light d' and reflects it to the second mirror 26 at a constant angle. The light c is received by the second mirror 26. The second mirror 26 reflects light to the third mirror 27. Light is then reflected from the third mirror 27 to the lens 28. The lens 28 focuses the light reflected by the third mirror 27. The charge coupled device sensor 29 receives light focused by lens 28 and converts the light to an electric signal, thereby scanning the sheet placed on the flat bed 43 in the manual scanning area 110.

Referring to FIG. 1, a process for scanning the sheet fed by the stacked-sheet feeder 104 will now be described. When the scanning function starts, after stacking the sheets 18a in the sheet feeding cassette 102 installed over the sheet cover 100, the automatic sheet feeding roller 14 is rotated clockwise and feeds by frictional force one sheet 18c from the stack of sheets 18a toward the scanning module 32. The lamp 22 installed inside the scanning module 32 illuminates the sheet 18c and the light d reflected from the sheet 18c is transmitted to the first mirror 106. The first mirror 106 reflects light c to the second mirror 26 at a constant angle. The light received by the second mirror 26 is reflected to the third mirror 27. The light received by the third mirror 27 is then reflected to the lens 28. The lens 28 focuses the light reflected by the third mirror 27. The charge coupled device sensor 29 receives focused light from the lens 28 and converts the focused light to an electric signal, thereby scanning the sheet 18c fed by the stacked-sheet feeder 110. The scanned sheet 18c is ejected to the tray 108 by the rotation of the exit roller 12 and the pinch roller 13. The next sheet stacked in the sheet feeding cassette 102 is fed toward the scanning module 32 by the turning force of the automatic sheet feeding roller 14.

With reference to FIG. 1, there are problems with the scanner apparatus shown. When a user wishes to scan a single sheet 18b using the flat bed 43 in the manual scanning area 110, the user must first lift the sheet cover 100. Lifting the sheet cover 100 is difficult due to the fact that the stacked-sheet feeder 104 is installed over the sheet cover 100. Moreover, since the stacked-sheet feeder 104 is installed over the sheet cover 100, a lot of space is needed to open the sheet cover 100 and a lot of space is needed to store the entire scanner apparatus. Furthermore, since the flat bed scanner apparatus is large, the flat bed scanner apparatus is restricted by installation space and hard to handle when moving. In addition, the tray 108 requires a lot of space and constitutes an inefficient use of space.

Figure 2:
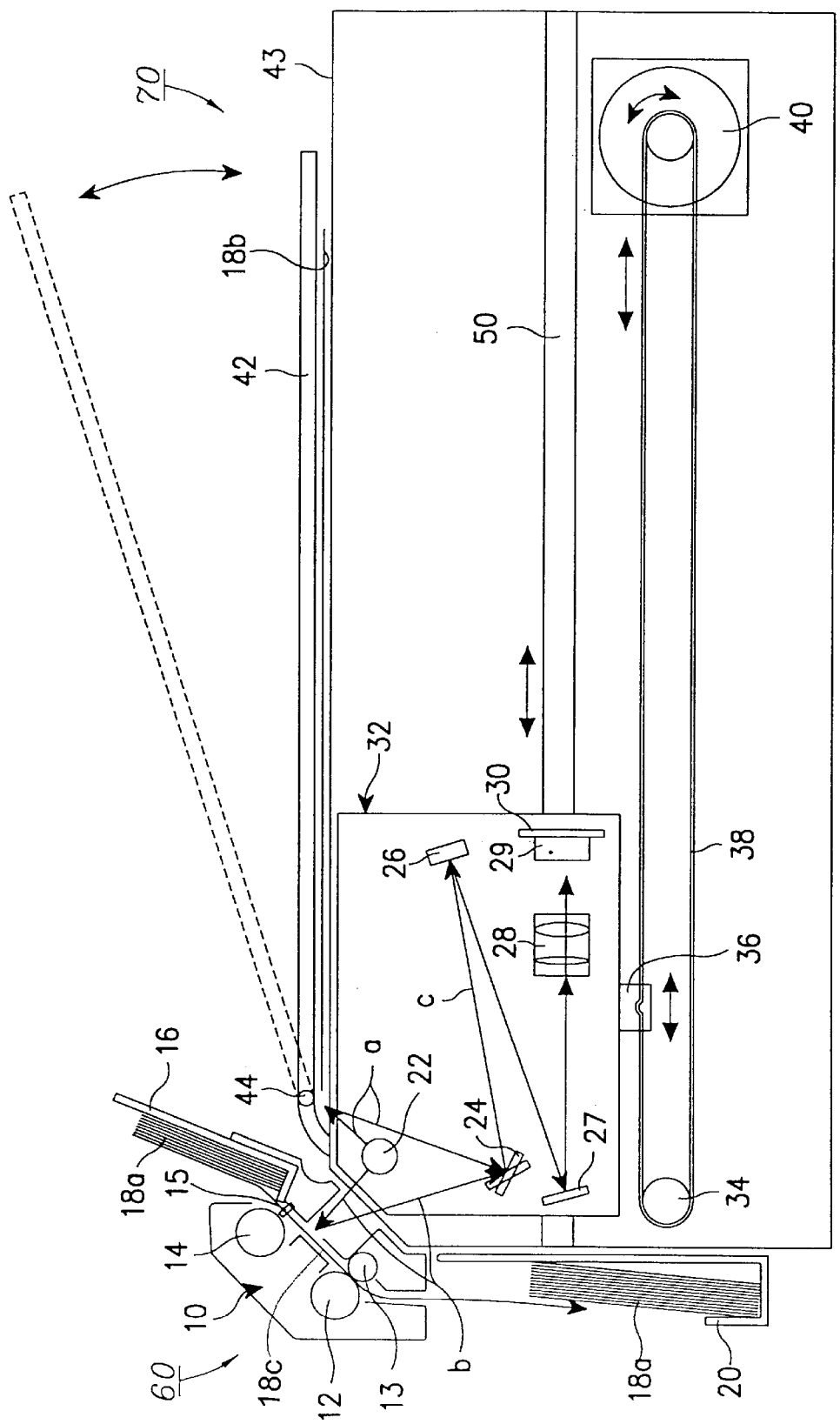
FIG. 2 illustrates a schematic diagram of a flat bed scanner apparatus in which a stacked-sheet feeder and a flat bed cover are separated from each other according to the principles of the present invention.

Refer now to FIG. 2, which illustrates a schematic diagram of a flat bed scanner apparatus in which a stacked-sheet feeder and a flat bed cover are separated from each other, according to the principles of the present invention. The flat bed scanner apparatus includes a manual scanning area 70 in which the individual sheet 18b can be placed on the flat bed 43 and also includes a stacked-sheet feeder 60 for feeding the sheets 18a stacked in a sheet feeding cassette 16. The stacked-sheet feeder 60 is installed at one end of the upper portion of the manual scanning area 70 and is not installed over the sheet cover 42. Thus, the sheet cover 42 can be lifted easily without lifting or moving the stacked-sheet feeder 60.

In FIG. 2, the manual scanning area 70 has the flat bed 43 for putting the individual sheet 18b thereon and a sheet cover 42 for firmly holding the sheet 18b on the flat bed 43. The sheet cover 42 has one end installed at a body frame by a hinge 44 and moves up and down. The scanning module 32 installed at the inner portion of the flat bed 43 scans seriatim the sheets 18a stacked in the sheet feeding cassette 16 and scans the sheet 18b on the flat bed 43. The lamp 22 in the scanning module 32 illuminates the sheet 18c fed from the stacked sheets 18a by the stacked-sheet feeder 60 and also illuminates the sheet 18b on the flat bed 43. A rotation mirror 24 installed below the lamp 22 receives light reflected from the sheet 18c fed by the stacked-sheet feeder 60, or light reflected from the sheet 18b on the flat bed 43 in the manual scanning area 70. Then the rotation mirror 24 reflects the received light to the second mirror 26.

Figure 3:
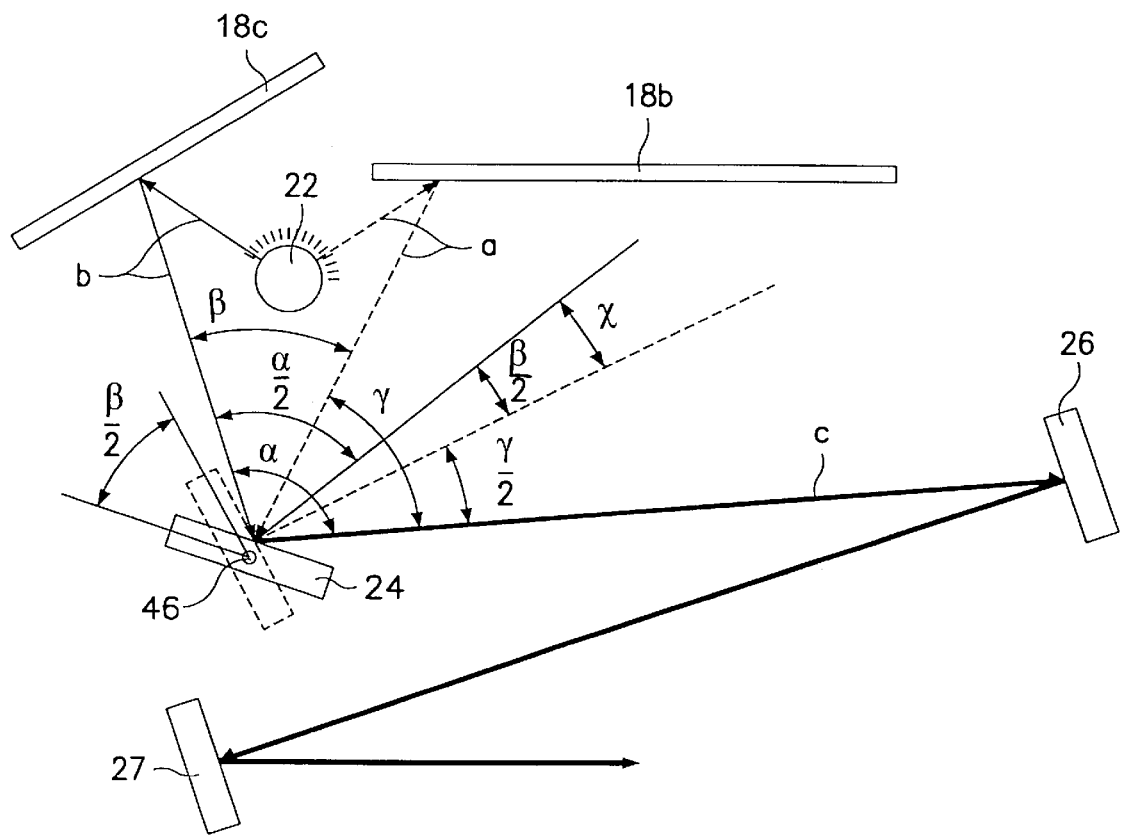
FIG. 3 illustrates optical paths formed during the scanning of a sheet in the stacked-sheet feeder and a sheet under the flat bed cover as well as corresponding positions of a rotation mirror, according to the principles of the present invention.
Figure 4:
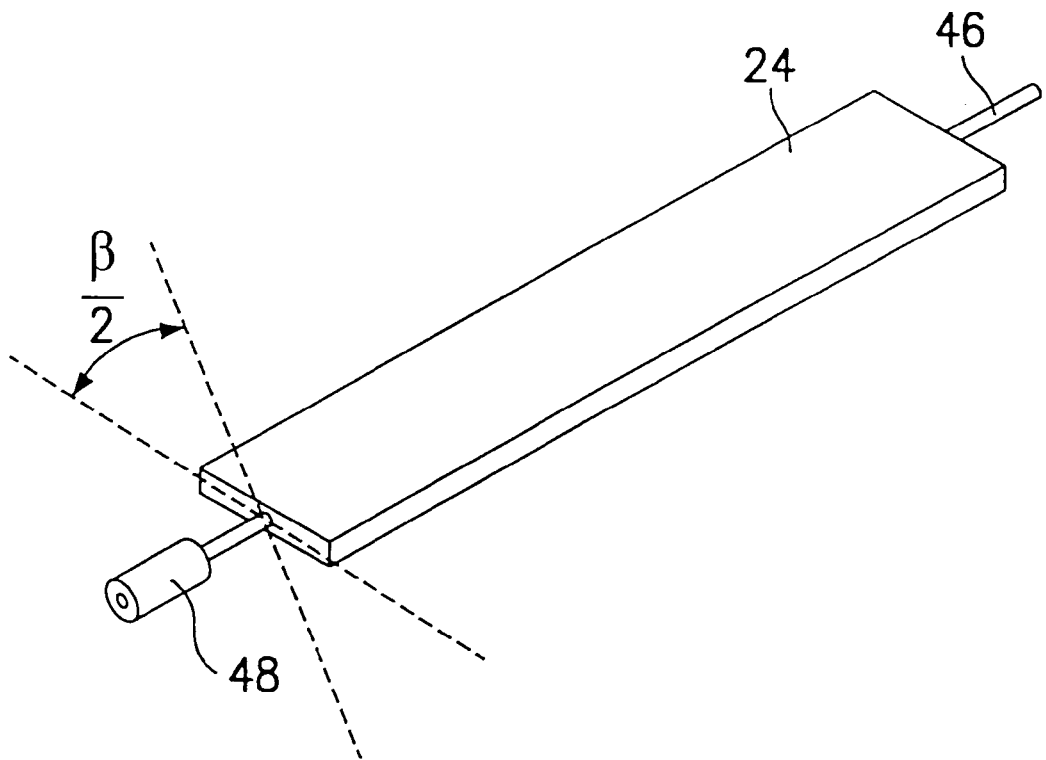
FIG. 4 illustrates a perspective view of a rotation mirror installed in a scanning module in the flat bed scanner apparatus of FIG. 2, according to the principles of the present invention.

Refer now to FIG. 3, which illustrates optical paths formed during the scanning of a sheet in the stacked-sheet feeder and a sheet under the flat bed cover as well as corresponding positions of a rotation mirror, according to the principles of the present invention. Refer now also to FIG. 4, which illustrates a perspective view of a rotation mirror installed in a scanning module in the flat bed scanner apparatus of FIG. 2, according to the principles of the present invention. The configuration and operation of the rotation mirror 24 will be described below with reference to FIGS. 3 and 4. A shaft 46 is coupled to the center of the rotation mirror 24. A motor 48 for generating driving force is installed at one end of the shaft 46. If the sheet fed by the automatic feeding roller 14 is sensed by a scan sensor 15, the motor 48 generates dynamic force to rotate the rotation mirror 24. The rotation mirror 24 may be rotated or stopped by an "ON/OFF" operation of a solenoid rather than by the turning force of the motor 48.

As shown in FIG. 3, when scanning the sheet 18c fed by the stacked-sheet feeder 60, the rotation mirror 24 rotated by the turning force of the motor 48 is rotated counterclockwise by ½ of an angle β between a light path reflected from the sheet 18b on the flat bed 43 and a light path reflected from the sheet 18c fed by the stacked-sheet feeder 60. That is, the rotation angle β/2 of the rotation mirror 24 can be obtained by the following equations (1) and (2):

$$\alpha-\gamma=\beta, \alpha=\beta+\gamma \quad (1)$$

$$\chi=\alpha-\alpha/2-\gamma/2=\beta/2 \quad (2)$$

where a is an optical path when scanning the sheet 18b on the flat bed 43, b is an optical path when scanning the sheet 18c fed by the stacked-sheet feeder 60, c is an optical path to which the optical paths a and b are reflected by the rotation mirror 24, α is an angle between the optical paths b and c, β is an angle between the optical paths a and b, γ is an angle between the optical paths a and c, and χ is an angle between normal lines of the optical paths a and b. When rotating the rotation mirror 24 by β/2 by the turning force of the motor 48, the sheet 18c fed by the stacked-sheet feeder 60 is scanned by the scanning module 32.

Again refer to FIG. 2. The second mirror 26 inclined at a constant angle receives light from the rotation mirror 24 and reflects that light to the third mirror 27. The third mirror 27 is installed below the rotation mirror 24. The lens 28 receives light from the third mirror 27 and then focuses that light. The charge coupled device sensor 29 is installed at the charge coupled device board 30. The charge coupled device sensor 29 receives focused light from the lens 28.

In FIG. 2, the driving motor 40 situated below the scanning module 32 reciprocates the scanning module 32 in the right and left direction when the scanning module 32 scans the sheet 18b on the flat bed 43. The belt 38 for transmitting the driving force of the driving motor 40 is installed at the belt pinch roller 34. The belt hanger 36 for hanging the belt 38 thereon is installed at the bottom of the scanning module 32. The shaft 50 is installed at the scanning module 32 and serves as a guide when the scanning module 32 moves in the right and left direction due to the movement of the belt 38. The stacked-sheet feeder 60 for feeding the sheets 18a is installed at one end of the sheet cover 42 separate from the sheet cover 42. The sheets 18a are stacked in the sheet feeding cassette 16 installed in the upward direction at one end of the sheet cover 42. The sheet feeding cassette 16 is inclined upwardly at a constant angle within a range such that it has no effect on the sheet cover 42 when the sheet cover 42 is moved up and down. The sheet cover 42 can be lifted up easily without lifting up the stacked-sheet feeder 60. The stacked-sheet feeder 60 is placed away from the sheet cover 42 in order to allow the sheet cover 42 to be light so that it can be lifted easily. The automatic sheet feeding roller 14 for feeding the sheets one by one by the frictional force is installed at one side of the sheet feeding cassette 16. The scan sensor 15 for driving the motor 48 by sensing that the sheet is fed is installed at the lower portion of the automatic sheet feeding roller 14. The pinch roller 13 and the exit roller 12 are for ejecting the sheets after they have been scanned by the scanning module 32. The sheets are ejected to the tray 20. The pinch roller 13 and the exit roller 12 are in contact with each other. The tray 20 is downwardly installed at one side of the front side of a body frame and has a "U" shape.

With reference to FIG. 2, a process for scanning the sheet placed on the flat bed 43 in the manual scanning area 70 will now be described. If the sheet 18b is put on the flat bed 43 after lifting up the sheet cover 42, and if a scanning function starts, the belt 38 is rotated along the belt pinch roller 34 and the belt hanger 36 by the turning force of the driving motor 40. The scanning module 32 performs reciprocating motion in the right and left direction along the shaft 50. The lamp 22 installed inside the scanning module 32 illuminates the sheet 18b as shown in FIG. 3. The light reflected to the sheet 18b is transmitted to the rotation mirror 24. The rotation mirror 24 reflects the light to the second mirror 26 at a constant angle. The light reflected to the second mirror 26 is further reflected to the lens 28 by the third mirror 27. The lens 28 focuses the light reflected by the third mirror 27. The charge coupled device sensor 29 converts the focused light received from the lens 28 to an electric signal, thereby scanning the sheet placed on the flat bed 43 in the manual scanning area 110.

With reference to FIG. 2, a process for scanning the sheet fed by the stacked-sheet feeder 60 will now be described. If the scanning function starts after stacking the sheets 18a in the sheet feeding cassette 16, the automatic sheet feeding roller 14 is rotated clockwise and feeds one sheet 18c from the stacked sheets 18a toward the scanning module 32 by frictional force. The scan sensor 15 senses that the sheet 18c is transmitted thereto and drives the motor 48 indicated in FIG. 4. The tuning force of the motor 48 is transmitted to the rotation mirror 24 by the shaft 46, and the rotation mirror 24 is rotated counterclockwise by 0/2. The lamp 22 installed inside the scanning module 32 illuminates the sheet 18c as shown in FIG. 3. The light reflected from the sheet 18c is transmitted to the rotation mirror 24. The rotation mirror 24 reflects the light to the second mirror 26 at a constant angle. The light received by the second mirror 26 is then reflected to the third mirror 27. The lens 28 receives light from the third mirror 27 and then focuses that light. The charge coupled device sensor 29 converts the focused light received from the lens 28 to an electric signal, thereby scanning the sheet 18c fed by the stacked-sheet feeder 60. The scanned sheet 18c is ejected to the tray 20 by the rotation of the exit roller 12 and the pinch roller 13. The next sheet stacked in the sheet feeding cassette 16 is fed to the scanning module 32 by the turning force of the automatic sheet feeding roller 14.

As described above, the flat bed scanner apparatus according to the present invention can selectively scan the sheets fed by the stacked-sheet feeder and the sheets placed on the flat bed by using one rotation mirror. Therefore, the total size of the flat bed scanner apparatus can greatly be reduced. Furthermore, the flat bed scanner apparatus is not restricted by installation space and can easily be moved. In addition, the sheet cover can be easily lifted because the stacked-sheet feeder is separate from the sheet cover.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A flat bed scanner apparatus for reading data from a sheet, comprising:

a first surface receiving a first original sheet when the first original sheet is being read;

a second surface receiving a second original sheet when the second original sheet is being read, said second surface being separate from said first surface, said second surface not being parallel to said first surface;

a cover being movable between a closed position covering said first surface and an open position allowing removable placement of the first original sheet onto said first surface;

a sheet feeder system separate from said cover, allowing said cover to be moved between said open position and said closed position without substantially moving said sheet feeder system, transporting the second original sheet onto said second surface and subsequently discharging the second original sheet downstream from said second surface;

an optical reading unit for reading one sheet selected from among the first and second original sheets, comprising a rotation mirror rotating to a first mirror position reflecting light from the first original sheet at said first surface when the first original sheet is being read, and rotating to a second mirror position reflecting light from the second original sheet at said second surface when the second original sheet is being read; and a reciprocation apparatus reciprocating said optical reading unit for reading the first original sheet on said first surface.

2. The flat bed scanner apparatus of claim 1, wherein said sheet feeder system comprises:

a first paper accommodating section containing a first plurality of documents including the second original sheet;

a second paper accommodating section containing a second plurality of documents; and a conveyor roller system transporting seriatim the first plurality of documents from said first paper accommodating section to said second surface and subsequently downstream to said second paper accommodating section.

3. The flat bed scanner apparatus of claim 2, wherein said first paper accommodating section is a tray containing the first plurality of documents substantially vertically standing on edge and said second paper accommodating section is a tray containing the second plurality of documents substantially vertically standing on edge.

4. The flat bed scanner apparatus of claim 2, further comprised of an original sheet sensor sensing when the second original sheet is in said first paper accommodating section.

5. The flat bed scanner apparatus of claim 4, wherein said optical reading unit having said rotation mirror further comprises:
- an optical reading unit body being stationary while reading the second original sheet on said second surface during transportation of the second original sheet across said second surface, and being reciprocated by said reciprocation apparatus while reading the first original sheet on said first surface;
- a light source for illuminating the first original sheet on said first surface and the second original sheet on said second surface;
- a lens for focusing light reflected from said rotation mirror;
- a photoelectric conversion unit converting light reflected from said lens to electrical signals; and
- a mirror rotation apparatus rotating said rotation mirror between said first mirror position and said second mirror position in accordance with said sensing of said original sheet sensor.

6. The flat bed scanner apparatus of claim 5, wherein said mirror rotation apparatus comprises a solenoid rotating said rotation mirror from said first mirror position to said second mirror position when the second original sheet is sensed to be in said sheet feeder system by said original sheet sensor, and rotating said rotation mirror from said second mirror position to said first mirror position when the second original sheet is not sensed to be in said sheet feeder system by said original sheet sensor.

7. The flat bed scanner apparatus of claim 5, wherein said mirror rotation apparatus comprises a mirror motor rotating said rotation mirror from said first mirror position to said second mirror position when the second original sheet is sensed to be in said sheet feeder system by said original sheet sensor, and rotating said rotation mirror from said second mirror position to said first mirror position when the second original sheet is not sensed to be in said sheet feeder system by said original sheet sensor.

8. The flat bed scanner apparatus of claim 1, wherein said rotation mirror is rotated from said first mirror position to said second mirror position by rotating said rotation mirror by one half of an angle formed between the light reflected from the first original sheet at said first surface and the light reflected from the second original sheet at said second surface.

9. The flat bed scanner apparatus of claim 1, wherein said rotation mirror is rotated from said first mirror position to said second mirror position when said rotation mirror is rotated counterclockwise by one half of an angle formed between the light reflected from the first original sheet at said first surface and the light reflected from the second original sheet at said second surface.

10. A flat bed scanner apparatus for reading data from a sheet, comprising:
- a first surface receiving a first original sheet when the first original sheet is being read;
- a second surface receiving a second original sheet when the second original sheet is being read, said second surface being separate from said first surface;
- a cover being movable between a closed position covering said first surface and an open position allowing removable placement of the first original sheet onto said first surface;
- a sheet feeder system separate from said cover, allowing said cover to be moved between said open position and said closed position without substantially moving said sheet feeder system, transporting the second original sheet onto said second surface and subsequently discharging the second original sheet downstream from said second surface; and
- an optical reading unit for reading the first and second original sheets, comprising a rotation mirror with a first mirror position reflecting light from the first original sheet on said first surface and a second mirror position reflecting light from the second original sheet on said second surface.

11. The flat bed scanner apparatus of claim 10, wherein said sheet feeder system comprises:
- a first paper accommodating section containing a first plurality of documents including the second original sheet;
- a second paper accommodating section containing a second plurality of documents; and
- a conveyor roller system transporting seriatim the first plurality of documents from said first paper accommodating section to said second surface and subsequently downstream to said second paper accommodating section.

12. The flat bed scanner apparatus of claim 11, wherein said first paper accommodating section is a tray containing the first plurality of documents substantially standing on edge and said second paper accommodating section is a tray containing the second plurality of documents substantially standing on edge.

13. The flat bed scanner apparatus of claim 11, further comprised of an original sheet sensor sensing when the second original sheet is in said first paper accommodating section.

14. The flatbed scanner apparatus of claim 10, wherein said optical reading unit having said rotation mirror further comprises:
- an optical reading unit body being stationary while reading the second original sheet on said second surface during transportation of the second original sheet across said second surface, and being reciprocated by said reciprocation apparatus while reading the first original sheet on said first surface;
- a light source for illuminating the first original sheet on said first surface and the second original sheet on said second surface;
- a lens for focusing light reflected from said rotation mirror;
- a photoelectric conversion unit converting light from said lens into electrical signals;
- a reciprocation apparatus reciprocating said optical reading unit body for reading the first original sheet on said first surface; and
- a mirror rotation apparatus rotating said rotation mirror between said first mirror position and said second mirror position.

15. The flat bed scanner apparatus of claim 10, wherein said rotation mirror is rotated from said first mirror position to said second mirror position by rotating said rotation mirror by one half of an angle formed between the light reflected from the first original sheet at said first surface and the light reflected from the second original sheet at said second surface.

16. The flat bed scanner apparatus of claim 10, wherein said rotation mirror is rotated from said first mirror position to said second mirror position when said rotation mirror is rotated counterclockwise by one half of an angle formed between the light reflected from the first original sheet at said first surface and the light reflected from the second original sheet at said second surface.

17. A flat bed scanner apparatus for reading data from a sheet, comprising:

a first surface receiving a first original sheet when the first original sheet is being read by said scanner apparatus;

a second surface receiving a second original sheet when the second original sheet is being read by said scanner apparatus, said second surface being separate from said first surface;

a cover being movable between a closed position covering said first surface and an open position allowing removable placement of the first original sheet onto said first surface;

a sheet feeder system separate from said cover, allowing said cover to be moved between said open position and said closed position without substantially moving said sheet feeder system, transporting the second original sheet onto said second surface and subsequently discharging the second original sheet downstream from said second surface;

an original sheet sensor sensing when the second original sheet is in said sheet feeder system;

an optical reading unit selectively reading the first original sheet on said first surface and the second original sheet on said second surface by varying an optical path of light illuminating the first and second original sheets; and a reciprocation apparatus reciprocating said optical reading unit for reading the first original sheet on said first surface.

18. The flat bed scanner apparatus of claim 17, wherein said sheet feeder system comprises:

a first paper accommodating section containing a first plurality of documents including the first original sheet standing on edge;

a second paper accommodating section containing a second plurality of documents standing on edge; and a conveyor roller system transporting seriatim the first plurality of original sheets from said first paper accommodating section to said second surface and subsequently downstream to said second paper accommodating section.

19. The flat bed scanner apparatus of claim 17, wherein said optical reading unit comprises:

a rotation mirror with a first mirror position reflecting light from the first original sheet on said first surface and a second mirror position reflecting light from the second original sheet on said second surface;

a mirror rotation apparatus rotating said rotation mirror between said first mirror position and said second mirror position in accordance with said sensing of said original sheet sensor;

an optical reading unit body being stationary while reading the second original sheet on said second surface during transportation of the second original sheet across said second surface, and being reciprocated by said reciprocation apparatus while reading the first original sheet on said first surface;

a light source for illuminating the first original sheet on said first surface and the second original sheet on said second surface;

a lens focusing light reflected from said rotation mirror; and a photoelectric conversion unit converting light from said lens into electrical signals.

20. The flat bed scanner apparatus of claim 19, wherein said rotation mirror is rotated from said first mirror position to said second mirror position by rotating said rotation mirror by one half of an angle formed between the light reflected from the first original sheet at said first surface and the light reflected from the second original sheet at said second surface.

* * * * *